(12) United States Patent
Frost

(10) Patent No.: US 8,275,020 B1
(45) Date of Patent: Sep. 25, 2012

(54) SECURE COMMUNICATION USING A NON-DIFFERENTIABLE WAVEFORM

(76) Inventor: Edward G. Frost, Poolesville, MD (US)

( * ) Notice: Subject to any disclaimer, the term of this patent is extended or adjusted under 35 U.S.C. 154(b) by 117 days.

(21) Appl. No.: 12/706,506

(22) Filed: Feb. 16, 2010

Related U.S. Application Data

(60) Provisional application No. 61/207,689, filed on Feb. 13, 2009.

(51) Int. Cl.
*H04B 1/00* (2006.01)
(52) U.S. Cl. .......................... 375/146; 375/130; 375/140
(58) Field of Classification Search .................... 375/146
See application file for complete search history.

(56) References Cited

U.S. PATENT DOCUMENTS

2007/0211687 A1* 9/2007 Benjebbour et al. .......... 370/347
2009/0003418 A1* 1/2009 Karabinis ..................... 375/219

OTHER PUBLICATIONS

Differentiable Functions, Daniel Beck, Sebastian Blohm, presented Feb. 2, 2005, available at http://www.activemath.org/teaching/mathSemWS0405/sessions/14/blohm_beck_deriv.ppt, last visited Oct. 25, 2011.*
See Calculus Tutorial, available at http://www.sagemath.org/calctut/differentiability.html, last visited Nov. 2, 2011.*
Non-Differentiable Functions, Encyclopedia of Mathematics, available at http://web.archive.org/web/20060825222751/http://eom.springer.de/default.htm ( Aug. 25, 2006), last visited Nov. 2, 2011.*

* cited by examiner

*Primary Examiner* — David C. Payne
*Assistant Examiner* — Erin File
(74) *Attorney, Agent, or Firm* — Edell, Shapiro & Finnan, LLC

(57) ABSTRACT

A transmitter system includes a processor that synthesizes a randomly varying, non-differentiable waveform by applying independent, pseudo-random variations to a number of transmission parameters to produce a number of independent pseudo-random variable stochastic processes with independent distributions within the waveform. Examples of transmitter parameters that can be varied include: a PN spreading sequence segment; a PN spreading symbol rate; a chip clock frequency; a chip frequency-dwell period; a data symbol rate; a data symbol rate dwell; an RF carrier frequency; and a carrier frequency dwell-time.

24 Claims, 11 Drawing Sheets

Fig. 6
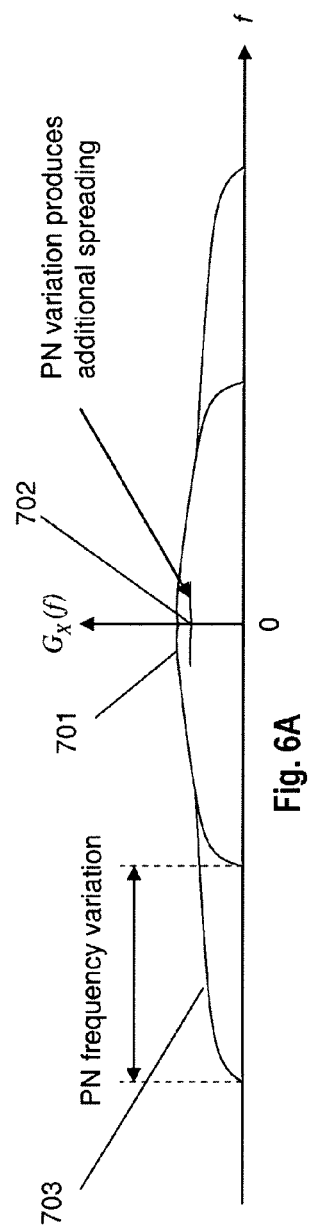
Fig. 6A
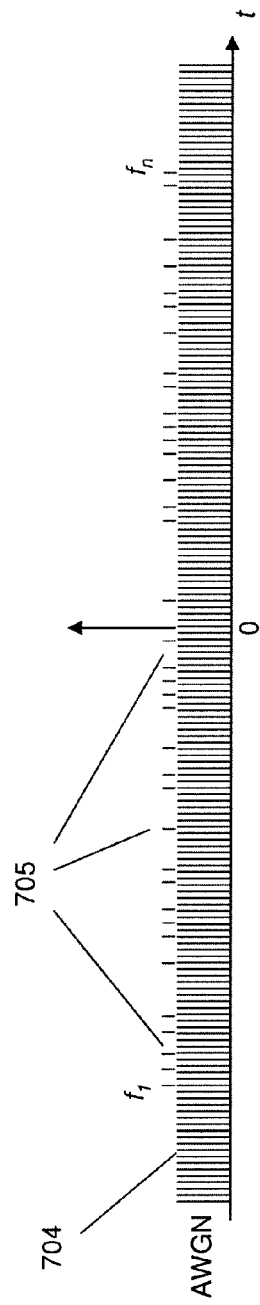
Fig. 6B

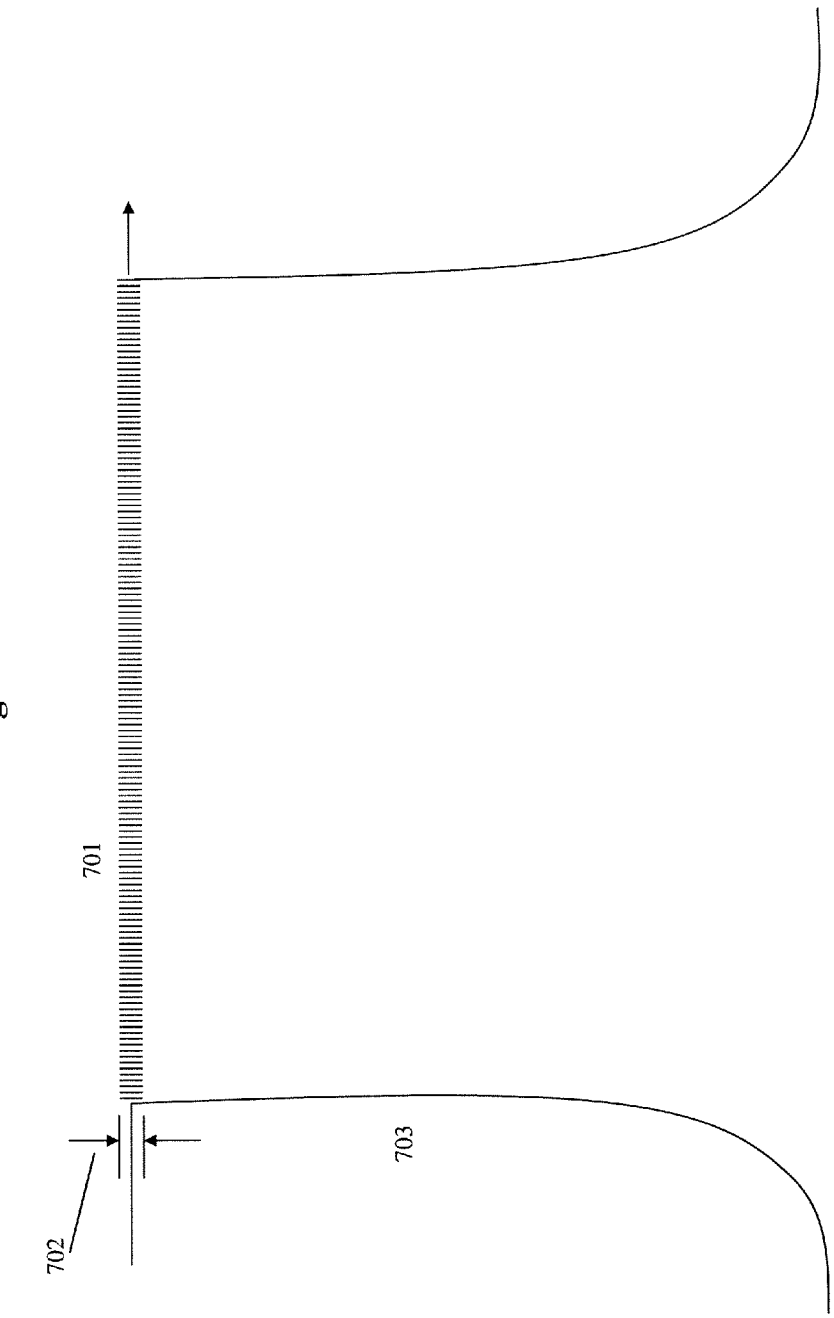

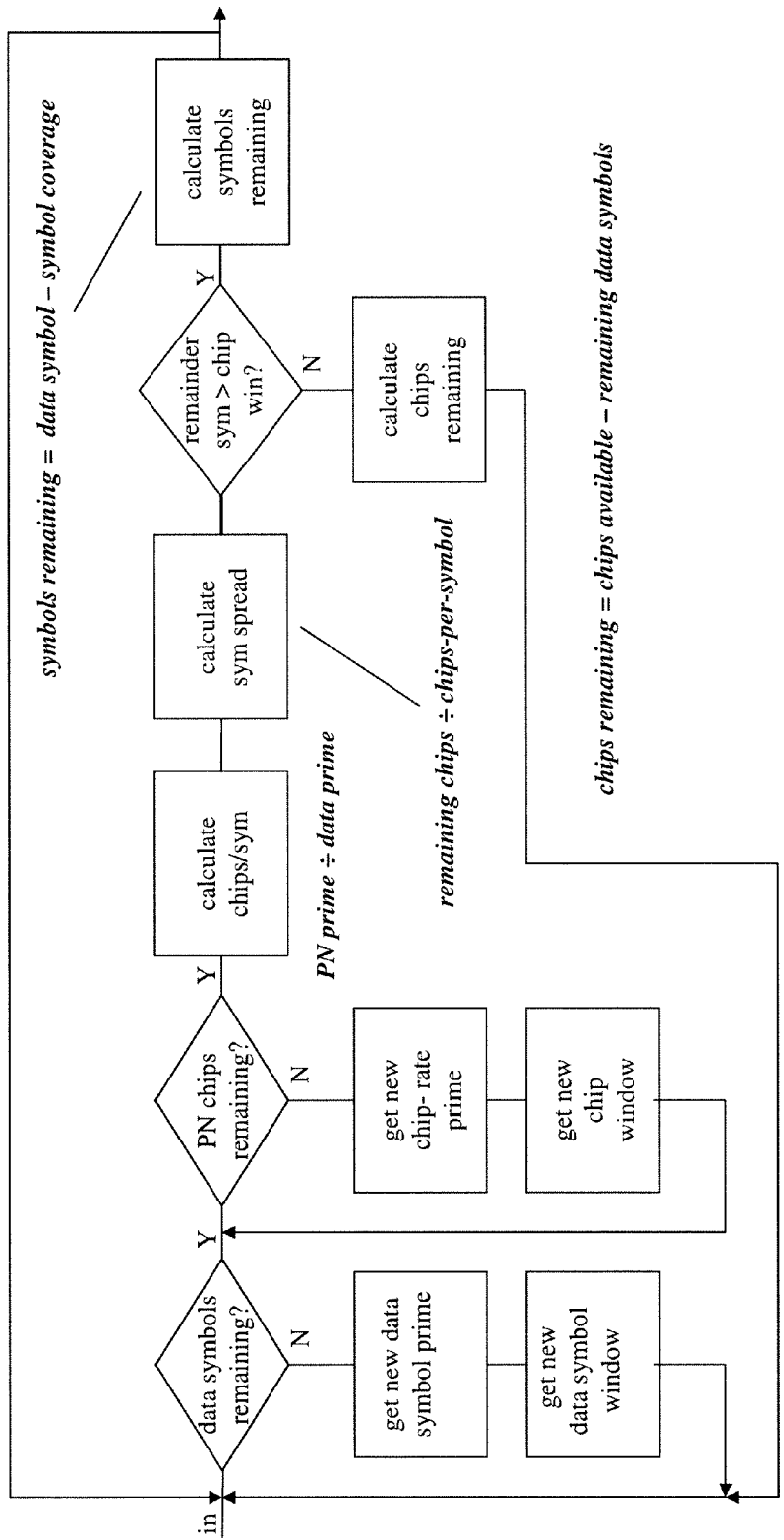

SECURE COMMUNICATION USING A NON-DIFFERENTIABLE WAVEFORM

CROSS REFERENCE TO RELATED APPLICATIONS

This application claims priority under U.S. §119(e) to U.S. Provisional Patent Application No. 61/207,689, entitled "Secure Waveform Method of Clandestine Communication," filed Feb. 13, 2009. This provisional application is hereby incorporated herein by reference in its entirety.

FIELD OF THE INVENTION

The field of the invention relates to the transmission of information by electromagnetic, optical and/or acoustical means, and more particularly to the security of the emission and inherently any and all information it may transport.

BACKGROUND

Information exchange is conventionally protected by encryption of the message, whereas the carrier itself is most often left unprotected for all to see, on the assumption that the information is rendered safe from extraction by unauthorized interceptors. Current advances in computer technology and processing power continue to drastically shorten the time required to decrypt all but the most complex encoding, such that only time-sensitive messages with no enduring value will be safe. Complex information encryption schemes typically increase overhead, slowing message transmission. Conventionally, encryption keys must be exchanged by communicants, thus rendering the encryption more vulnerable than ever. Furthermore, the knowledge that messages are actually being transmitted and/or exchanged is often of value and, where radio is used as the transmission medium, the radio signature itself provides a wealth of location, traffic, and source information. Such signals are easily intercepted, exploited and jammed, if desired, or used for radio location to be exploited in other ways.

Numerous schemes have also been devised to hide radio transmissions below the level of the ambient additive white Gaussian Noise (AWGN), and to secure the waveform itself using direct sequence spread spectrum (DSSS) technology and introduction of other pseudo-random elemental variations.

In prior and contemporary art, while addition of these variations add to the complexity of the waveform, signal intelligence (SIGINT) signal feature extraction methodology, enabling signal reconstruction, has kept pace with these incremental advances. Accurate timing synchronization is generally required prior to and during communications to both facilitate and maintain communications, when using such technology. Furthermore the incremental advances of communications security, (COMSEC), and SIGINT appear to follow a path of diminishing returns.

SUMMARY

The technique described herein departs from approaches used in prior and contemporary art to overcome the numerous shortcomings therein. More specifically, a "non-differentiable" waveform that minimizes the radio signature is generated and transmitted, which denies the observer metadata information necessary to extract signal features. The waveform, including all sub-elements, is non-ergodic and frequency and information rate agnostic. The approach described herein renders the transmitted signal virtually invisible to all except the intended correspondents and secures the carrier as a discrete element, as opposed to the information it carries. The transmitted signal has a highly suppressed, low, flat spectral profile devoid of all deterministic and cyclostationary elemental artifacts and has characteristics, blends with, and becomes part of the ambient AWGN, making the signal difficult to detect and unauthorized acquisition extremely difficult. The waveform is continuously mathematically generated, using unrelated virtual timing (not derived from master timing clock or other) of all elements. Element timing is based on continuous random non-repetitive selection of prime numbers The communication scheme employs a novel phase shift keying modulation scheme that greatly reduces impulse responses. No masking algorithm keys are transmitted or exchanged. Instead, dynamically generated, never-exchanged, unique, one-time keys are used. A unique key is allocated to each communication, and keys may be instantly changed at will. Reverse engineering will not reveal the keys. The non-differentiable waveform and never-exchanged unique dynamically generated one-time keys form a highly secure communications combination. The described technique does not interfere with or limit the use of information and, or protocol encryption, in any way, does not introduce transmission overhead, and does not interfere with transmission protocols in any way.

The signals generated by the described system have a number of advantageous characteristics. The signals are highly orthogonal and/or having very low level cross correlation characteristics and enhance spectrum and bandwidth efficiency. The nature of the signals permits use of physically and spectrally co-located wireless systems that are virtually impervious to jamming and interference. The system is applicable to both fixed and mobile communications and may be applied to communications systems using wireless, free-space optical, fiber optics, copper, acoustical and other man-made or natural transmission media.

The described system may be realized using inexpensive hardware. For example, commercial/industrial grade master timing oscillators may be used, and the system does not require access to a high resolution timing source such as GPS. The system can synchronize with severely drifted clocks and can synchronize with differing clocks after being shutdown.

BRIEF DESCRIPTION OF THE DRAWINGS

FIG. 6a shows a more detailed view of the example in FIG. 6F.

FIG. 6b shows spikes resulting from the chip-clock frequency change impulse response occurring at random intervals.

FIG. 7 illustrates an example of the secure waveform spectral profile.

FIG. 11 shows an example of a flow chart for primitive timing.

DETAILED DESCRIPTION

Figure 1:
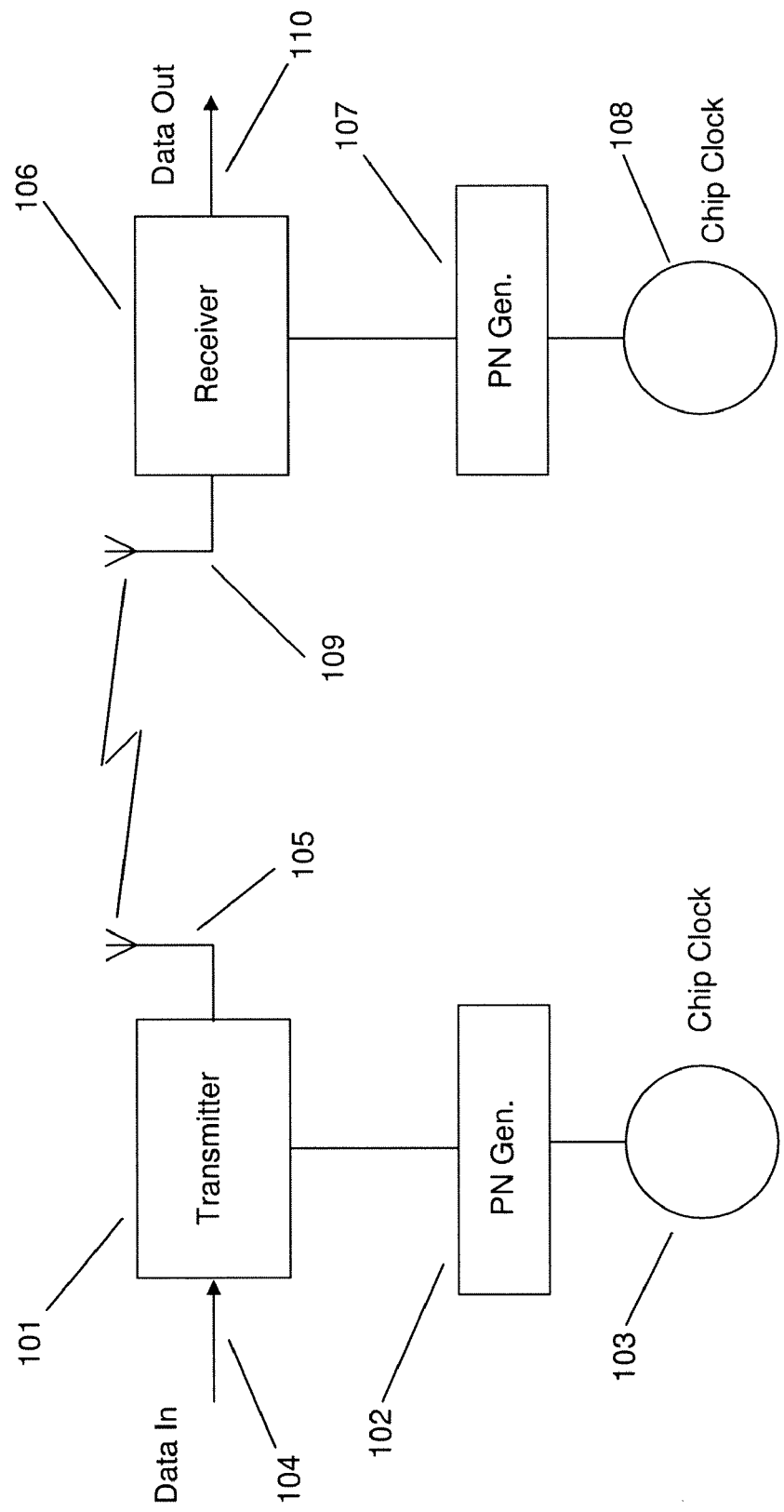
FIG. 1 is a simplified diagram of a conventional DSSS radio link.

The invention is based on a combination of the following well known mathematical and physical principals:

1. Auto Correlation of White Gaussian Noise

The autocorrelation of white Gaussian noise (WGN) is given by the inverse Fourier transform of the noise power spectral density WGN(f):

$$Ra_{WGN}(\tau) = \int_{-\infty}^{\infty} WGN(t) \cdot WGN(t+\tau)dt = F^{-1}\{G_{WGN}(f)\} = (N_0/2)\delta(t)$$

The auto-correlation function is:

$Ra_{WGN}(\tau)$ is 0 for $\tau \neq 0$

Any two different samples of WGN, regardless of their close proximity will fail to correlate due to the truly random nature of WGN:

$G_{GWN}(f) = N_0/2$ Watts/Hertz

Cross correlation is impractical, because it is impossible to generate a reference.

2. Central Limit Theorem

"The probability distribution of the sum of j statistically independent random variables approaches Gaussian distribution as $j \to \infty$, no matter what the individual distribution functions may be."

The probability density function (PDF) of W=X+Y is: hence:

$$f_W(w) = \int_{-\infty}^{\infty} fx(w-y)fy(y)dy = \int_{-\infty}^{\infty} fx(x)fy(w-x)dx$$

$$P_w(w) = \sum_{k=-\infty}^{\infty} Px(k)Py(w-k)$$

thus:

$f_w(w) = f_x(x) \otimes f_y(y)$

It follows therefore that the probability function, (PDF), of $w = x_1 + x_2 \ldots x_n$ is:

$f_w(w) = f_{x1}(x_1) \otimes f_{x2}(x_2) \otimes \ldots \otimes f_{xn}(x_n)$

The product of n unrelated pseudo-random stochastic processes ($P_n$) greatly decreases any deterministic aspects of the signal.

When n sets of independently random variables are used in unison, the number of possible combinations and permutations of events in the resulting distribution rapidly becomes extremely large.

3. AWGN Variance

AWGN is an idealized process, having a two sided power spectral density equal to a constant $N_0/2$ for all frequencies from $-\infty$ to $\infty$. The noise power variance, as noise has a zero mean, is:

$$\sigma^2 = \text{var}[n(t)] \int_{-\infty}^{\infty} (N_0/2)df = \infty$$

The variance for filtered AWGN is finite. Correlated with one of a set of orthonormal functions, the variance of the correlator output is:

$$\sigma^2 = \text{var}(n_j) = E\left\{\left[\int_{-\infty}^{\infty} n(t)\psi_j(t)dt\right]^2\right\} = N_0/2$$

The secure waveform plus noise produces a totally noise-like correlator output, in the absence of a synchronized signal reference.

4. Uncertainty Principle of Information

In accordance with the "Uncertainty Principle of Information", a signal observed over a limited time interval, or window, has limited spectral definition because the Fourier spectrum of a wave observed over a finite interval or window, is the convolution of the true spectrum of the wave with the Fourier transform of the window itself. The window $T_w$ observed in FIG. 3a has the familiar sin(x)/x from of the Fourier transform shown in FIG. 3b $1/T_w$. the shorter duration window, shown in FIG. 3c transforms to a broader peak as seen in FIG. 3d, $\Delta f = 1/T_w$. Spectral windows containing relatively few cycles contain little spectral information, since $\Delta f/f_0 \approx 1$.

5. Markov Process

A Markov process X(t), is by definition:

The process X(t) is a random process whose past has no influence on its future, if its present is specified; that is, if $t_n > t_{n-1}$ then:

$P[X(t_n) \leq x_n | X(t), t \leq t_{n-1}] = P[X(t_n) \leq x_n | X(t_{n-1})]$ it follows that if $t_1 < t_2 < \ldots < t_n$, then:

$P[X(t_n) \leq x_n | X(t_{n-1}), X(t_{n-2}), \ldots, X(t_1)] = P[X(t_n) \leq x_n | X(t_{n-1})]$ As the PDF of the secure waveform is Gaussian, the penultimate waveform processes are Gauss-Markov and, 't' is small, to comply with the Uncertainty Principle of Information.

The strength of this new waveform can best be described in terms of probabilistic processes.

6. Wiener Process

The Wiener process is a Gaussian process. It is well known that Gaussian random variables are independent. Along with the following Wiener process properties, the foregoing form key underpinnings of the invention. The main properties for $W = (W_t)_{t \geq 0}$, as follows:

(a) "$W_0 = 0$." This shows that at zero point in time there is no information (event) available.

(b) "Paths, (trajectories), of a Wiener process are continuous functions of $t \in (0, \infty)$." Showing that t is an element of the set of all time from 0 to infinity. As mentioned in the foregoing, the Central Limit theorem states that: "Under very general conditions, the probability distribution of the sum of j statistically independent random variables approaches the Gaussian distribution as $j \to \infty$, no matter what the individual distribution functions may be." This is an important foundation of the invention's random nature. It should be noted that all the events in a Wiener process are independent, supporting the above statement that it is a Gaussian process.

(c) "Random vector $(W_{t1}, \ldots, W_{tn})$ is Gaussian for any $t_1, \ldots, t_n$." This is an important feature of the invention as it confirms that examination of any time window of the waveform will not divulge any feature or other parameter which may be used to exploit the signal.

(d) "Expectation, $EW_t=0$." The expected value '$EW_t$' is a parameter of the Wiener process probability model indicating that that any single event in the process has no effect on any other. This is a highly desirable property of the invention, thus it denies the observer metadata information necessary to extract signal features, hence detection and compilation of waveform features and parameters.

(e) "Increments of the Wiener process on non-overlapping intervals are independent." All increments of the invention are separate and thus non-overlapping, rendering them independent.

(f) "Paths of the Wiener process are not differentiable." The paths, i.e., the functions, of the Wiener process are non-continuous, a discontinuity occurring between all events. A discontinuous function is not differentiable, by definition. This property applies to the invention, being fundamental to the low probability of intercept-low probability of exploitation (LPI-LPE) aspect of the waveform.

(g) "Orthogonality of increments for non-overlapping intervals, for $s_1 < s_2 < s_3 < s_4$ $E(W_{s4}-W_{s3})(W_{s2}-W_{s1})=(s_2-s_1)-(s_2-s_1)=0$" Because of this orthogonality, the waveform greatly enhances spectral bandwidth and efficiency and anti jamming (AJ) capability. A number of the waveforms described herein and other signals may coexist in the same spectral and physical locations, enhancing the spectral efficiency considerably beyond the capability of contemporary DSSS, CDMA and contemporary LPD/LPI systems.

(h) The following well known proof shows that the paths of the Wiener process are not differentiable functions:
Where $h > 0$ define $$\Delta(h) = \frac{W_{s+h} - W_s}{h},$$

show that $$\lim_{h \to 0} \Delta(h)$$

does not exist.

Assume that the limit exists. Then the limit for the Fourier transform $$(i = \sqrt{-1}) \lim_{h \to 0} E e^{i\lambda \Delta(h)}$$

exists and is a function of $\lambda$.

Hence, since the random variable $\Delta(h)$ is zero mean Gaussian with the variance $$E \frac{(W_{s+h} - W_s)^2}{h^2} = \frac{1}{h},$$

we find:

$$E e^{i\lambda \Delta(h)} = e^{-\frac{\lambda^2}{2h}} \xrightarrow[h \to 0]{} \begin{Bmatrix} 1 & \lambda = 0, \\ 0 & \lambda \neq 0 \end{Bmatrix} := U(\lambda)$$

Since $U(\lambda)$ is a discontinuous function, the assumed differentiability is not valid.

7. Ergodicity

A stationary random signal is defined to be an ergodic signal if all of its statistical properties can be estimated from a single realization of sufficiently large finite length.

For an ergodic signal, time averages equal ensemble averages derived via the expectation operator in the limit as the length of realization goes to infinity. For a real ergodic signal:

$$\text{mean value}: m_X = \lim_{M \to \infty} \frac{1}{2M+1} \sum_{n=-M}^{M} x[n]$$

$$\text{variance}: \sigma_X^2 = \lim_{M \to \infty} \frac{1}{2M+1} \sum_{n=-M}^{M} (x[n] - m_X)^2$$

$$\text{autocovariance}: \gamma_{XX}[l] = \lim_{M \to \infty} \frac{1}{2M+1} \sum_{n=-M}^{M} (x[n] - m_X)(x[n+l] - m_X)$$

The limiting operation required to compute the ensemble averages by means of time averages is still not practical in most situations and therefore replaced with a finite sum to provide an estimate of the desired statistical properties. The following approximations are often used:

$$\hat{m}_X = \frac{1}{M+1} \sum_{n=0}^{M} x[n]$$

$$\hat{\sigma}_X^2 = \frac{1}{M+1} \sum_{n=0}^{M} (x[n] - m_X)^2$$

$$\hat{\gamma}_{XX}[l] = \frac{i}{M+1} \sum_{n=0}^{M} (x[n] - m_X)(x[n+l] - m_X)$$

8. Prime Numbers

A prime number (prime), by definition, is a natural number which has exactly two distinct natural number divisors, '1' and itself. Also, it will be recognized, '1', by definition, is not a prime.

Embodiments of the invention are described in the context of direct sequence spread spectrum (DSSS) radio equipment and systems. However, it will be readily apparent to those skilled in the art, that the present invention and embodiment details described herein are applicable to virtually any type of information transmission systems using, but not limited to, wireless, free-space optical, fiber optics, copper, acoustical, and other transmission media. Thus, the present invention shall not be construed as limited in any way to specific examples provided herein.

Conventional DSSS radio transmissions, while lower in instantaneous power spectral density than equivalent peaked signal transmissions and often immersed in the AWGN, are still easily detectable by virtue of the additive characteristic of white Gaussian noise showing increased power spectral density in the signal's location coupled with deterministic and cyclostationary features of the signal. These same features enable a would-be interceptor to gather and assemble information sufficient to determine the parameters of the signal and location of the emitter, thus permitting signal acquisition and, or effective jamming. Furthermore, in conventional communications it is necessary for encryption keys used to establish pseudo-random noise, PN, sequences and other variable parameters to be exchanged over the air, or stored in memory in the equipment.

Although it is possible to use conventional key exchange, generation and storage, the present invention establishes the necessary unique signal parameter algorithm coefficients without exchange of keys and significantly reduces or eliminates each of the deterministic and cyclostationary features replacing them by a combination of non-repetitive, unrelated, dynamically programmable stochastic processes. More specifically it creates a unique randomly varying non-differentiable waveform for each transmission, thereby increasing the difficulty of signal detection, unauthorized acquisition and exploitation.

The main deterministic and cyclostationary features of a conventional DSSS are:
1) Carrier
   a) Constant spectral profile
   b) Strictly band limited
   c) Band defined
   d) Well defined signature
2) Data Symbol Rate
   a) Predetermined unvarying rate, repetitive symbol duration
3) Chip Rate
   a) Predetermined unvarying rate.
   b) PN symbols create cyclostationary modulation features in combination with deterministic data symbol rate.
4) PN—Pseudo-Random-Noise Spreading Code
   a) The PN sequence becomes repetitive in most applications
   b) Easily detected.
   c) Sequence can be compiled by an unauthorized interceptor.

All the foregoing features facilitate compilation of information, based on which, it is possible to determine the transmission signal parameters thereby enabling its acquisition.

Figure 2:
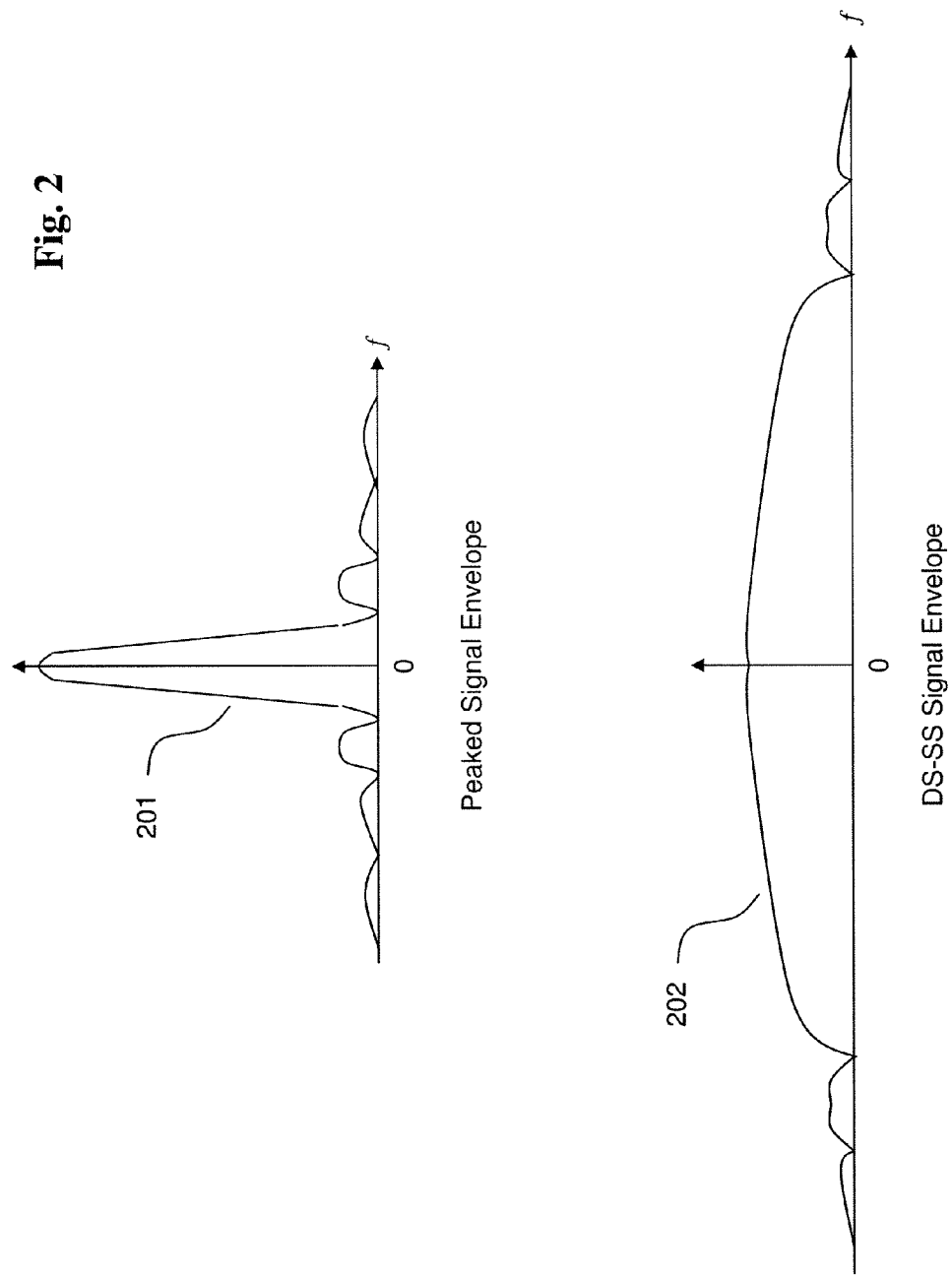
FIG. 2 illustrates a spectral comparison of a peaked signal and a conventional DSSS signal.

FIG. 1 is a simplified diagram of a conventional DSSS radio link comprising a transmitter 101 and a receiver 106. The data input 104 modulates the transmitter carrier frequency, which in turn is further modulated, to spread the signal, by a pseudo-random noise, (PN), sequence 102, clocked at a constant frequency by a chip clock 103, operating at a higher periodic rate than that of the data symbol input 104. The resulting conventional spread signal is transmitted to the receiver in which the signal is de-spread and the data 110, retrieved by a reversal of the transmit process using well established methods. A spectral comparison of a peaked signal 201, and a conventional DSSS signal 202, is shown in FIG. 2.

Figure 3:
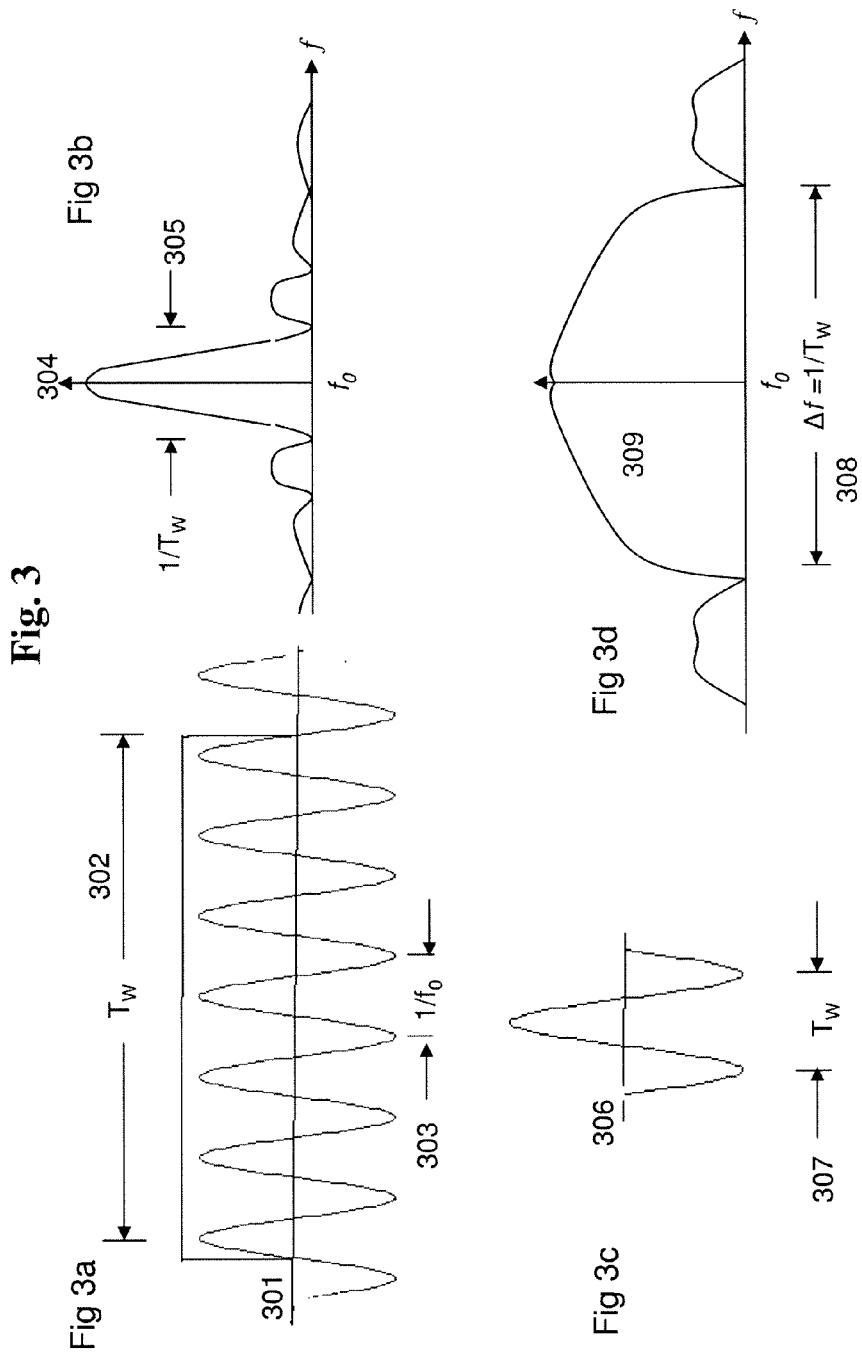
FIGS. 3a-3d shows an application of the Uncertainty Principle of Information.

In the present invention all deterministic and cyclostationary features of a conventional DSSS enumerated above are completely removed. All variations and sequences are independent of each other and unique for all variables. As previously stated, one of the key objectives of this invention is to radically increase the difficulty of exploitation of the waveform and the information carried by it. The invention drastically reduces the RF signature both in instantaneous magnitude and recognizable profile in conjunction with which it reduces individual waveform component spectral information below the level required for re-compilation of the waveform without the use of an accurate temporally synchronized reference signal. FIG. 3 shows the application of the Uncertainty Principle of Information as mentioned in the foregoing.

It should be noted that the drawings in FIG. 3 are not to scale and temporal and spectral windows are purposely disproportionate for ease of explanation. FIG. 3a shows a time window $T_w$ 302, of a sinusoidal sequence 301. The Fourier transform of the waveform 301 gives the familiar sin(x)/x spectral representation in FIG. 3b. The transformed window $1/T_w$ is represented by the main lobe 305, while the single cycle $1/f_0$, 303, appears as the peak, 304. When the window 302, is shortened, as shown in FIG. 3c, 307, making the time of observation more precise, its transform spectrally blurs, as seen in FIG. 3d. It will be seen, therefore, that the spectral information alone contained in FIG. 3d is insufficient to determine its exact frequency. The lack of spectral information present in the waveform invention described herein, therefore greatly increases the difficulty of reconstructing the waveform when presented only with spectral information. The accurate timing information contained in a reference signal will enable complete recognition and placement of the representative spectral code elements. As stated in the foregoing, when n sets of independently random variables are used in unison, the number of possible combinations and permutations of events in the resulting distribution rapidly becomes extremely large. In the following invention embodiment example, eight unrelated, random stochastic sequences are used, each containing a large number of random events. It will be readily seen by those familiar with both the art and the underlying theory that the number of combinations and permutations tends to become astronomical, therefore, without sufficient spectral and temporal information it becomes almost impossible to extract the necessary information to reconstruct any of the component sequences sufficiently to retrieve the transmitted data.

In the following example of an embodiment of the invention, eight independent pseudo-random variable stochastic processes with independent distributions are employed. Pseudo-random variations are applied to the following:
   PN spreading sequence segment, on a one-time use basis.
   PN spreading symbol rate, i.e., length
   Chip clock frequency.
   Chip frequency-dwell period.
   Data symbol rate, i.e., length.
   Data symbol rate dwell.
   RF carrier frequency (dithering).
   Carrier frequency dwell-time.

A number of other variations are also possible, for example, including, but not limited to;
   Separate PN codes for the in-phase (I) real, part of the complex signal and the quadrature (Q) imaginary, part.
   Carrier phase dithering.
   Multiple tandem PN modulation stages each with individual variations.
   Carrier amplitude adjustment.

The number of variations applied to waveform generation was severely limited in prior art due to the inability of communicants to synchronize. Communication using a waveform comprised of a combination of numerous independent stochastic components is facilitated, in this invention, by its ability to synchronize when employing other than highly accurate timing devices, as described in U.S. patent application Ser. No. 11/434,510, filed May 16, 2006, and entitled Methods and Apparatus for Masking and Securing Communications Transmissions, which is hereby incorporated by reference herein in its entirety.

Randomly selected unique sections of unique PN sequences for use on a one-time basis only may be generated in a multiplicity of ways, for example, but not limited to, using well-known shift register methodology, or by other more secure cryptographic algorithms. The use of random length segments of randomly selected PN sequences for one time use significantly increases the difficulty of assembling the complete unique sequence required for dispreading the signal. Where linear feedback shift register (LFSR) or similar methodology is used to generate the PN, where the PN length is equal to $2^n-1$ and n=the number of internal states, the first n symbols are not used as these may indicate the length of the total PN and hence facilitate recognition of the unique PN sequence. The use of specific symbol groups or sequences from other PN generation methodologies are similarly avoided. Using the segments and sequence on a one-time only basis denies the would-be unauthorized interceptor the any advantage of information gleaned from prior intercept attempts. Furthermore, the non-repetitive nature of the signal prevents even occasional spectral lines in signal analysis.

It will immediately be apparent to those familiar with the art that the PN and chip-clock rate may be varied in several ways, for example, but not limited to:

Varying chip-clock frequency and dwell times applied to directly to the PN spreading sequence, with total chips per symbol as an integer.

Varying chip-clock frequency and dwell times applied to directly to the PN spreading sequence, where the total chips per data symbol is not necessarily an integer.

Varying chip-clock frequency and dwell times with random clock phase changes independent of data symbol transition positioning.

Varying chip-clock frequency and dwell times with random clock phase changes, some of which are timed to coincide with potential data symbol transition timing.

A combination of two, or more, unrelated PNs are used to spread the signal.

A combination of two, or more, unrelated PNs with coincident variations.

A combination of two, or more, unrelated PN segments with coincident variations.

A combination of two, or more, unrelated multiple PN segment sequences with coincident variations.

A combination of two, or more, unrelated PNs with unrelated variations.

A combination of two, or more, unrelated PN segments with unrelated variations.

A combination of two, or more, unrelated multiple PN segment sequences with unrelated variations.

A combination of two, or more, unrelated PNs applied to both I and Q are used to spread the signal.

A combination of two, or more, unrelated PN segments applied to both I and Q are used to spread the signal A combination of two, or more, unrelated multiple PN segment sequences applied to both I and Q are used to spread the signal Combinations of any and all of the above variation methods.

Figure 4:
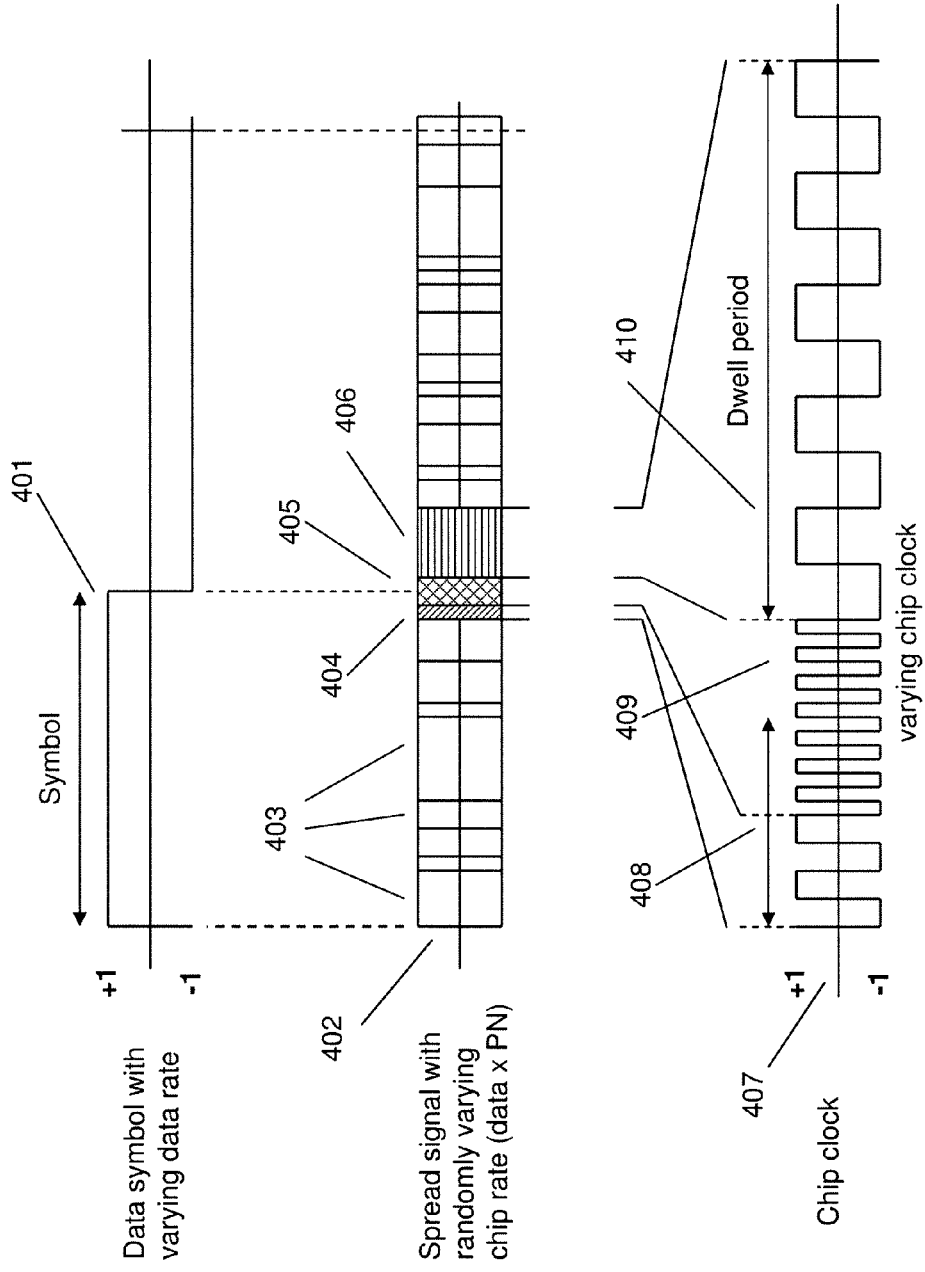
FIG. 4 shows how a signal is spread by a PN with varying chip and dwell rate.

FIG. 4 shows how the signal is spread by a PN with a varying chip rate. The signal is spread by the varying PN modulating the two data symbols 401, resulting in a combination of frequency variations of the spread signal, 402. The period for which the chip rate frequency remains constant is called the dwell-time. The dwell-time for any one PN chip frequency is pseudo-random, such that it is not deterministic and will not produce cyclostationary features in the output signal. A number of varying PN chip clock frequencies with pseudo-random dwell-times 403 are shown during the two data symbol duration spread signal sequence, 402. Three specific frequency variations and dwell times, 404, 405 and 406, are shown with related varying chip clock timing 408, 409 and 410, in chip clock sequence 407. It will be seen that the two data symbols are of unequal duration, depicting random data rate variation. The random variable data symbol rate has a further randomizing effect on the signal spreading and is illustrated here to also show that the number of chips per symbol is not necessarily an integer as this would contribute an undesirable deterministic feature to the waveform. It further shows that a chip frequency dwell period can typically span the data symbol transition as seen in 405.

Figure 5:
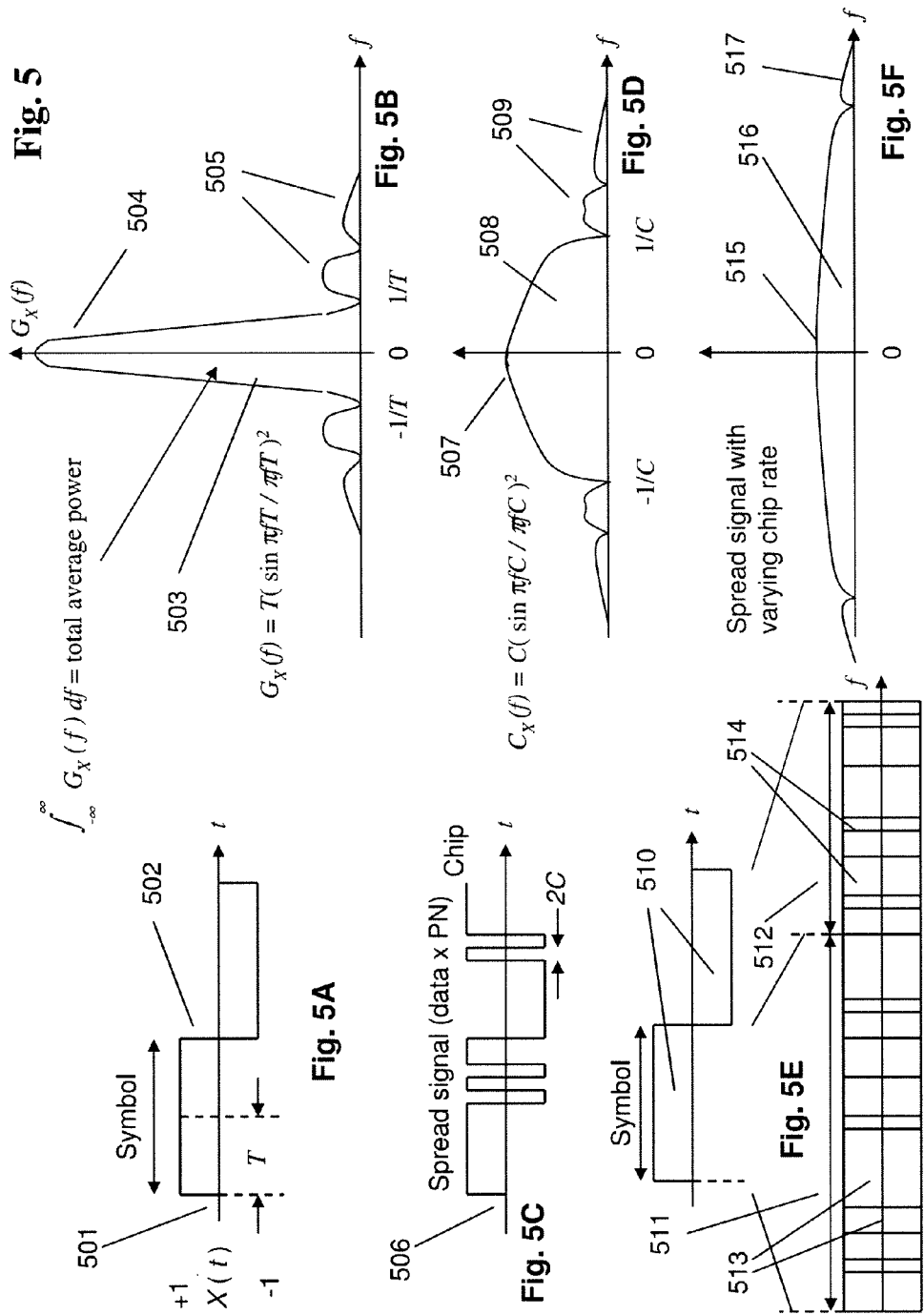
FIGS. 5a-5f show the spectral results of two conventional digitally modulated radio signals, peaked signal and DSSS, and the RF signal envelope resulting from an exemplary embodiment of the invention.

The spectral results of two conventional digitally modulated radio signals, peaked signal and DSSS, plus the RF signal envelope resulting from this partial embodiment of the invention, are shown in FIG. 5. The data input 501, with symbol 502, to a conventional peaked radio signal transmitter is shown in FIG. 5A, with the resulting spectral response portrayed in FIG. 5B. The signal is characterized by a narrow bandwidth main lobe 504, with high amplitude, the total average power 603, being contained therein. The spread signal using a PN applied at a steady, unvarying, chip rate, 506, in FIG. 5C, produces the familiar conventional DSSS RF envelope shown in FIG. 5D. The same total average power, 508, as the signal in FIG. 5B is now contained in a much wider bandwidth main lobe with correspondingly lower amplitude, 507. Side-lobes, 509, are also further suppressed, compared to the corresponding spectral features, 505, in FIG. 5B.

In this partial embodiment example of the present invention, the symbols, 510, in FIG. 5E, are spread by a PN sequence (not shown) using a number of pseudo-randomly varying chip-clock frequencies, and dwell times, 513 and 514, as described in the foregoing, producing the frequency varying sequences, 511 and 512, corresponding to the two symbols. The resulting RF envelope is shown in FIG. 5F. The amplitude, 515, is much less than 607, in FIG. 5D, but the total average power, 516, is the same, with proportionally differing and continuously varying spectral occupancy, as evidenced by the position of the secondary lobes, 517. FIG. 6A shows a more detailed view of the example in FIG. 7F. The amplitude of the main lobe, 601, 602, varies according to the amount of spreading resulting from the particular chip-clock frequency and PN-symbol product during each dwell period. As the spreading, 603, momentarily increases, the amplitude, 601, will drop to 602, with the total average power remaining constant. The AWGN, 604, in FIG. 6B is shown at constant amplitude for illustrative purposes only with the spikes, 605, resulting from the chip-clock frequency change impulse response, occurring at random intervals. In the case of real AWGN characterized by random amplitude variations, these impulses will blend into and become part of it. It will be readily apparent to those familiar with the art that variations independent of but similar to the foregoing chip variations, applied to the data symbol sequence will, in turn, further randomize the signal spread to facilitate the AWGN characterization.

Carrier dithering, comprising short-term random frequency shift, with randomized short term dwell periods serves to flatten the overall spectral response, 701, as shown in FIG. 7 such that the usual collection of greater amplitude responses do not tend to centralize, or clump, thus further decreasing the RF signature and blending the signal with the AWGN. The signal amplitude variations 702 are minimized such that their addition to the AWGN is insignificant making detection almost if not totally impossible, depending on the signal to noise ratio, which operationally will be negative in most cases. Optimum results are obtained with randomization that does not produce a center frequency; thus, randomizing the spectral response to remove all band definition and thereby greatly decreasing signature characteristics which may act as discriminators aiding identification of the increase in power spectral density as a signal as compared to normal random noise perturbations. The optimum randomization coupled with optimum frequency deviation and dwell result in a flat table top signal with sharp natural sideband roll-off, 703, and no visible side-lobes. FIG. 7 shows the spectral signature of this example of embodiment of this invention.

The timing of each waveform element and variation in this invention is independent of all others. All timing sources are independently randomly selected and have independently random durations. The timing sources are prime numbers, or random integer permutations, and/or combinations thereof. The timing period of primitive source is not permitted to run for the total prime number count and always terminates prior to the total count. For example, if the prime number '19' is used, the number of usable clock cycles are any randomly selected number less than 19, i.e. any number 1 through 18. Prime numbers of any magnitude may be randomly selected for use on a one-time basis only. Each prime number is used for a short period only in order to deny the would-be unauthorized interceptor the any advantage of timing information recognition or period synchronization. Random selection of primes numerically close enough to create timing seemingly similarly periodic for one or more elements or variations is prevented by disallowing the use of primes closer than some predetermined value. For example, primes in the range 29 through 67 are: 29, 31, 37, 41, 43, 47, 53, 59, 61 and 67. It will be readily seen that many are numerically very close to adjacent primes and even if the order is randomized it is possible that two or more primes may coincidentally have less than desirable numerical difference and result in timing frequencies that could be erroneously identified as similar and aid an unauthorized observer in signal acquisition. Insufficient numerical separation for any primes used in any communications session, either sequentially or randomly spaced can appear as repetition of timing due to periodic similarity. Therefore, when generating any and all ranges of primes, usable primes can be separated by either a single integer, or a random range of integers, applied between each to provide the necessary timing differential. In the example range above, a single separation integer of 8 will give a usable prime range of: 29, 37, 47, 59, 67 all being separated numerically by at least 8. Using random separation numbers of at least 9, 4, 6, 7, 5, will give 29, 37, 41, 47, 59, 67.

It will be readily seen that the larger primes will require a greater separation to avoid apparent periodic timing similarity. Thus, separation integers of appropriate magnitude are employed in correspondence to the numerical size of the primes, as a further precaution against unauthorized interception and timing recognition It will immediately be apparent to those familiar with the art that primes used for timing may be randomly selected in several ways, for example, but not limited to:

Randomly from all mathematically available primes.

Randomly from all mathematically available primes provided it is numerically usably different, as defined in the foregoing, from all other primes used during the communications session or other defined time and/or usage period.

Randomly from a specific group of all mathematically available primes.

Randomly from a specific group of all mathematically available primes provided it is numerically usably different from all other primes used during the communications session or other defined time and/or usage period.

Randomly from a subgroup of usably numerically separated, as defined in the foregoing, of a specific group of all mathematically available primes Randomly from one or more subgroups of usably numerically separated, as defined in the foregoing, of a specific group of all mathematically available primes.

Randomly from one or more subgroups of usably numerically separated, as defined in the foregoing, of one or many specific groups of all mathematically available primes.

Combinations of any and all of the above selection methods.

The secure waveform in this invention is non differentiable.

(a) The waveform is comprised of a continuous stream of stochastic processes.
(b) It may be compared to a growing pile of sand.
(c) The grains exhibit no interrelationship.
(d) Their size, color, time of arrival in the pile has no apparent significance.
(e) Contrary to other secure waveforms, the longer the observation window, the less information is gleaned-dilution effect, law of diminishing returns.
(f) The waveform is a Wiener process indicating that any single event has no effect on any other, hence non-differentiable.
(g) The waveform may be likened to Brownian motion, described by the Wiener process.
(h) All of the waveform sub-elements are Gauss-Markov processes.
(i) It is non-ergodic.
(j) It has the inverse characteristics of an ergodic waveform: the more you see, the less you get, i.e., it operates according to the law of diminishing returns.
(k) The waveform is continuously mathematically generated, permitting unrelated virtual timing (not derived from master timing clock or other single source) of all elements.
(l) All timing is based on continuous random non-repetitive selection of prime numbers.
(m) Thus, any common timing root will be the product of all primes in operation at that specific instant in time only. Possible only with the virtual mathematical timing for waveform generation.
(n) The use of Minimum Impulse Phase Shift Keying (MI-PSK) removes or radically reduces all undesirable modulation impulse and step function artifacts.
(o) Denies feature extraction and assembly.

Primitive Timing

All timing is independent, unrelated for all elements and variations being based on prime numbers. There can be no timing convergence using prime numbers except as at their product.

All sequences used, primitive or otherwise, are never completed, thus no inter element correlation ever exists and signal ergodicity is expressly prevented. The fact that no sequence is ever completed contributes to the non-ergodic nature of the waveform.

A Markov process X(t), is by definition:

The process X(t) is a random process whose past has no influence on its future, if its present is specified; that is, if $t_n > t_{n-1}$ then:

$$P[X(t_n) \leq x_n | X(t), t \leq t_{n-1}] = P[X(t_n) \leq x_n | X(t_{n-1})]$$

it follows that if $t_1 < t_2 < \ldots < t_n$, then:

$$P[X(t_n) \leq x_n | X(t_{n-1}), X(t_{n-2}), \ldots, X(t_1)] = P[X(t_n) \leq x_n | X(t_{n-1})]$$

As the PDF of the secure waveform is Gaussian, the penultimate and preceding waveform processes are Gauss-Markov. 't' is small to comply with the Uncertainty Principle of Information.

The strength of this new waveform can best be described in terms of probabilistic processes. The robustness of the combinations and resulting process far exceed prior and most of contemporary technology. Examination of secure waveforms by probabilistic means is the most realistic metric and means of comparison of the performance of this type of technology, as described in the foregoing. In the invention, the data symbol is first varied in length, i.e., duration, then a group of one or more symbols are transmitted after which the symbol length is varied again, i.e., dwell. Another group of one or more symbols, or totaling a different number of symbols is then transmitted and so on, ad infinitum. Each individual "dwell" group is treated as a separate distribution, as shown in "The Gauss-Markov Process in the Invention". The PN spreading symbols are varied in a similar manner. All variations are independent of each other for all processes.

The basic data symbol sequence and the spreading (PN) sequences, prior to variation, are both iid (Independent, Identically Distributed, random sequences). A random sequence $X_n$, in which ... $X_{-2}, X_{-1}, X_0, X_1, X_2$ ... are iid random variables. An iid random sequence occurs whenever independent events occur at a constant rate. An iid random sequence can be either discrete-value or continuous-value.

Gauss-Markov Process in the Invention

In the invention the data symbol is first varied in length, i.e., duration, then a group of one or more symbols is transmitted after which the symbol length is varied again. Another group totaling a different number of symbols is then transmitted and so on, ad infinitum. Each individual "dwell" group is treated as a separate distribution, as shown:
data symbol sequence: x(t) x(t_d)
data symbol: T $$f_X(x) = f_x(x_1)f_x(x_2) \ldots f_x(x_k) = \prod_{i=1}^{k} f_X(x_i).$$

length-varied symbol:
 for: $t_d = T$ $x_{dv} = x(t_{dv}) = x(t_d + t_{L1}) t_{L1} \in (0, t_{nd}) \; 0 \leq t_{L1} \leq t_{nd} \; t_{nd} = \text{max variation}$ symbol length dwell:

$x_{dwell} = x(t_{dwell}) = x(t_{dv}) t_{dwell} = x_{tv} t_{dwell} \; t_{dwell} \in (1, \infty)$
$t_{dv} \leq t_{dwell} \leq \infty$ data signal PDF:

$f_{d1}(D_1) = f_{x_{dv1}}(x_{dv1}) \otimes f_{x_{dv2}}(X_{dv2}) \otimes \ldots \otimes f_{x_{dvn}}(x_{dvn})$ $f_W = f_{x_{dv1}}(x_{dv1}) \otimes f_{x_{dv2}}(X_{dv2}) \otimes \ldots \otimes f_{x_{dvn}}(x_{dvn})$ Because $t_{L1}$ and $t_{dwell}$ are random, the PDF of the process is Gauss-Markov.

Data Symbol and PN Sequences in the Secure Waveform

The data symbol sequence and the spreading (PN) sequences are both iid random sequences. A random sequence $X_n$, in which ... $X_{-2}, X_{-1}, X_0, X_1, X_2$ ... are iid random variables. An iid random sequence occurs whenever independent events occur at a constant rate. An iid random sequence can be either discrete-value or continuous-value. In the discrete case each random variable $X_i$ has PMF $P_{X_i}(x) = P_x(x)$, while in the continuous case, each $X_i$ has PDF $f_{X_i}(x) = f_x(x)$.

For random iid sequence $X_n$, a discrete process, the sample vector $X = [X_{n1} \ldots X_{nk}]''$ has joint PMF $$P_X(x) = P_X(x_1)P_X(x_2) \ldots P_X(x_k) = \prod_{i=1}^{k} P_X(x_i)$$

For a continuous-value process, the joint PDF of $X = [X_{n1} \ldots X_{nk}]''$ is:

$$f_X(x) = f_x(x_1)f_x(x_2) \ldots f_x(x_k) = \prod_{i=1}^{k} f_X(x_i).$$

Non-Differentiable Paths of Wiener Process

The following proves that the paths of the Wiener process are not differentiable functions:
 Where h>0 define $$\Delta(h) = \frac{W_{s+h} - W_s}{h},$$

show that $$\lim_{h \to 0} \Delta(h)$$

does not exist.

Assume that the limit exists. Then the limit for the Fourier transform $$(i = \sqrt{-1}) \lim_{h \to 0} E e^{i\lambda \Delta(h)}$$

exists and is a function of $\lambda$.

Hence, since the random variable $\Delta(h)$ is zero mean Gaussian with the variance $$E \frac{(W_{s+h} - W_s)^2}{h^2} = \frac{1}{h},$$

we find:

$$E e^{i\lambda \Delta(h)} = e^{-\frac{\lambda^2}{2h}} \xrightarrow[h \to 0]{} \begin{Bmatrix} 1 & \lambda = 0, \\ 0 & \lambda \neq 0 \end{Bmatrix} := U(\lambda)$$

Since $U(\lambda)$ is a discontinuous function, the assumed differentiability is not valid.

Ergodic Signals

For an ergodic signal, time averages equal ensemble averages derived via the expectation operator in the limit as the length of realization goes to infinity. For a real ergodic signal:

$$m_X = \lim_{M \to \infty} \frac{1}{2M + 1} \sum_{n=-M}^{M} x[n]$$

$$\sigma_X^2 = \lim_{M \to \infty} \frac{1}{2M + 1} \sum_{n=-M}^{M} (x[n] - m_X)^2$$

-continued $$\gamma_{XX}[l] = \lim_{M\to\infty} \frac{1}{2M+1} \sum_{n=-M}^{M} (x[n] - m_X)(x[n+l] - m_X)$$

The limiting operation required to compute the ensemble averages by means of time averages is still not practical in most situations and therefore replaced with a finite sum to provide an estimate of the desired statistical properties. The following approximations are often used:

$$\hat{m}_X = \frac{1}{M+1} \sum_{n=0}^{M} x[n]$$

$$\hat{\sigma}_X^2 = \frac{1}{M+1} \sum_{n=0}^{M} (x[n] - m_X)^2$$

$$\hat{\gamma}_{XX}[l] = \frac{i}{M+1} \sum_{n=0}^{M} (x[n] - m_X)(x[n+l] - m_X)$$

A stationary random signal is defined to be an ergodic signal if all of its statistical properties can be estimated from a single realization of sufficiently large finite length. The secure waveform is non-ergodic because it does not fulfill any of the requirements for signal ergodicity.

Waveform Resistance to Feature Extraction

Chapman-Kolmogorov equations use a recursive approach to calculate n-step transition probabilities based on accumulated knowledge of transiting from state i to state j in n+m steps after being in state k for n steps. Given the current state $X_m$, prediction of the next state $X_{n+m}$ requires knowledge of the conditional PMF.

For a finite Markov chain, the n-step transition probabilities are given by the matrix P(n) which has i, jth element.

$$P_{ij}(n) = P[X_{n+m} = j | X_m = i]$$

Chapman-Kolmogorov equations for a finite, discrete-time, Markov chain, the n-step transition probabilities satisfy:

$$P_{ij}(n+m) = \sum_{k=0}^{K} P_{ik}(n) P_{kj}(m),$$

$$P(n+m) = P(n)P(m)$$

It will be seen, therefore, that although the sub-element combinations are Markovian they are also non-ergodic so that with insufficient information to establish even a single feature in a secure waveform Gauss-Markov sequence, the Chapman-Kolmogorov recursive equations are ineffective.

As mentioned in the foregoing, in spread spectrum transmissions, state transitions normally occur at discrete time instants. In the absence of discernable discrete time instances, the waveform may be treated as a continuous process, a continuous-time Markov chain described by a stochastic process $\{X(t)|t \geq 0\}$, where X(t) is the state of the system at time t.

In a continuous time Markov chain, the state transitions may occur at any time, and the time between transitions is exponentially distributed. Since the exponential distribution is memory-less, the future outcome of the process depends only on the present state and does not depend on when the last transition occurred or what any of the previous states were.

By definition, a continuous-time Markov chain $\{X(t)|t \geq 0\}$ is a continuous-time, discrete-value random process such that for an infinitesimal time step $\Delta$:

$$P[X(t+\Delta) = j | X(t) = i] q_{ij} \Delta$$

implies that:

$$P[X(t+\Delta) = j | X(t) = i] = 1 - \sum_{j \neq i} q_{ij} \Delta$$

$$P[X(t+\Delta) \neq i | X(t) = i] = \sum_{j \neq i} q_{ij} \Delta$$

This assumes that only one transition can occur during time $\Delta$. In addition the definition implies that in every infinitesimal interval of length $\Delta$, a Bernoulli trial determines whether the system exists state i.

It should be noted that a continuous-time Markov sequence is closely related to the Poisson process. In a Poisson process where $\lambda$ is the limiting rate that for any small time $\Delta$, a Bernoulli trial with an arrival probability of $\lambda\Delta$, the next arrival is an exponential ($\lambda$) random variable. In the limit $\lambda \to 0$, the transition for a Markov chain in state i the time until the next transition will be an exponential random variable with the parameter:

$$v_i = \sum_{j \neq i} q_{ij}$$

where $v_i$ is the departure rate of the state i.

Insomuch as the Wiener process is a martingale, under specific conditions it can be probabilistically reconstructed by use of Ito or other stochastic calculus. The well known Ito integral is:

$$Y_t = \int_0^t H_s dX_s$$

The prerequisite of the equation is that sequence, i.e., the secure waveform Wiener process must be adapted. As the components of the waveform, the Wiener process, are inaccessible, therefore unknown without a reference timing signal (template), Ito integration or other form of stochastic calculus will be unsuccessful.

Figure 8:
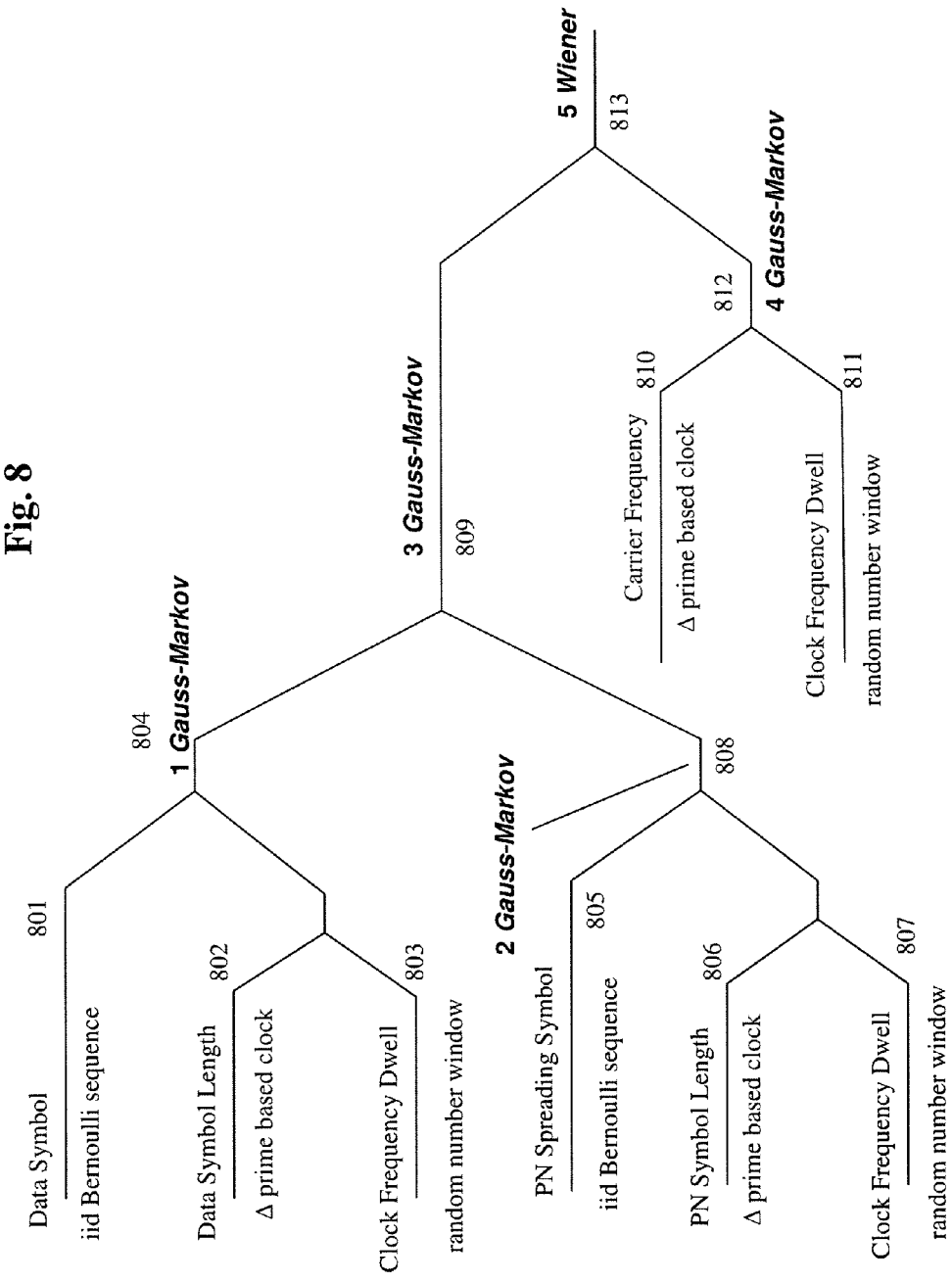
FIG. 8 illustrates an example of the secure waveform elemental stochastic process structure.

The secure waveform in this invention is a series of independent, unrelated, random stochastic processes combined to produce a non-differentiable waveform. The following is an example of embodiment of the invention by this method. As shown in FIG. 8, the waveform is comprised of a number of elements, independently timed and windowed. The main elements in this example are, but not limited to, data symbols, PN symbols, (chips) and RF frequencies. Each of these elements requires a clock input. In this invention, prime numbers are used for timing. Each prime number employed is used for a period less than its length, before it is changed. Each one being used once only for a random number of cycles only, such that it defies discovery of the prime used by any unauthorized observer. The usage period for each prime is determined by a random number based window. In all cases the window is shorter than the prime it controls and in many cases very much shorter.

FIG. 8 shows one of numerous possible combinatorial sequences of the elemental random stochastic processes comprising the waveform in this embodiment example of the invention. The input data stream, 801, is a Bernoulli, independent identically distributed (iid) random sequence. In this case, this means that the timing is constant but the logical state is random. The constant timing is replaced by continuous random selection of independent prime number timing elements, used only once, 802, which change the data symbol length for random numbers of symbols in accordance with the clock frequency dwell, 803, which in turn is a random integer based window. The pseudo-randomly varied data stream, 804, is now a Gauss Markov process described in the foregoing.

The concatenated pseudo-randomly selected PN segment symbols, 805, as described in the foregoing, are also an iid Bernoulli random sequence. The PN symbol length is pseudo-randomly varied by continuous random selection of independent prime number timing elements, used only once, 806, which change the PN symbol length for random numbers of symbols in accordance with the clock frequency dwell, 807, which in turn is a random integer based window, 807. The pseudo-randomly varied data stream, 808, is now a Gauss Markov process described in the foregoing.

The two Gauss-Markov processes, 804 and 808, now combine to form a third independent Gauss-Markov process, 809.

The RF carrier frequency, 810, is pseudo-randomly determined by continuous random selection of independent prime number timing elements, used only once. The carrier frequency is dithered, i.e. instantaneously shifted from one frequency to another nearby frequency for short pseudo-random periods of time. The period of time at which the carrier remains at a particular frequency is determined by the clock frequency dwell, 811, which is a random integer based window. The dithered carrier frequency, 812, is a Gauss-Markov process. The independent Gauss-Markov processes, 809 and 812, combine to form a non-differentiable Wiener process, 813, in accordance with the mathematical process described in the foregoing.

Figure 9:
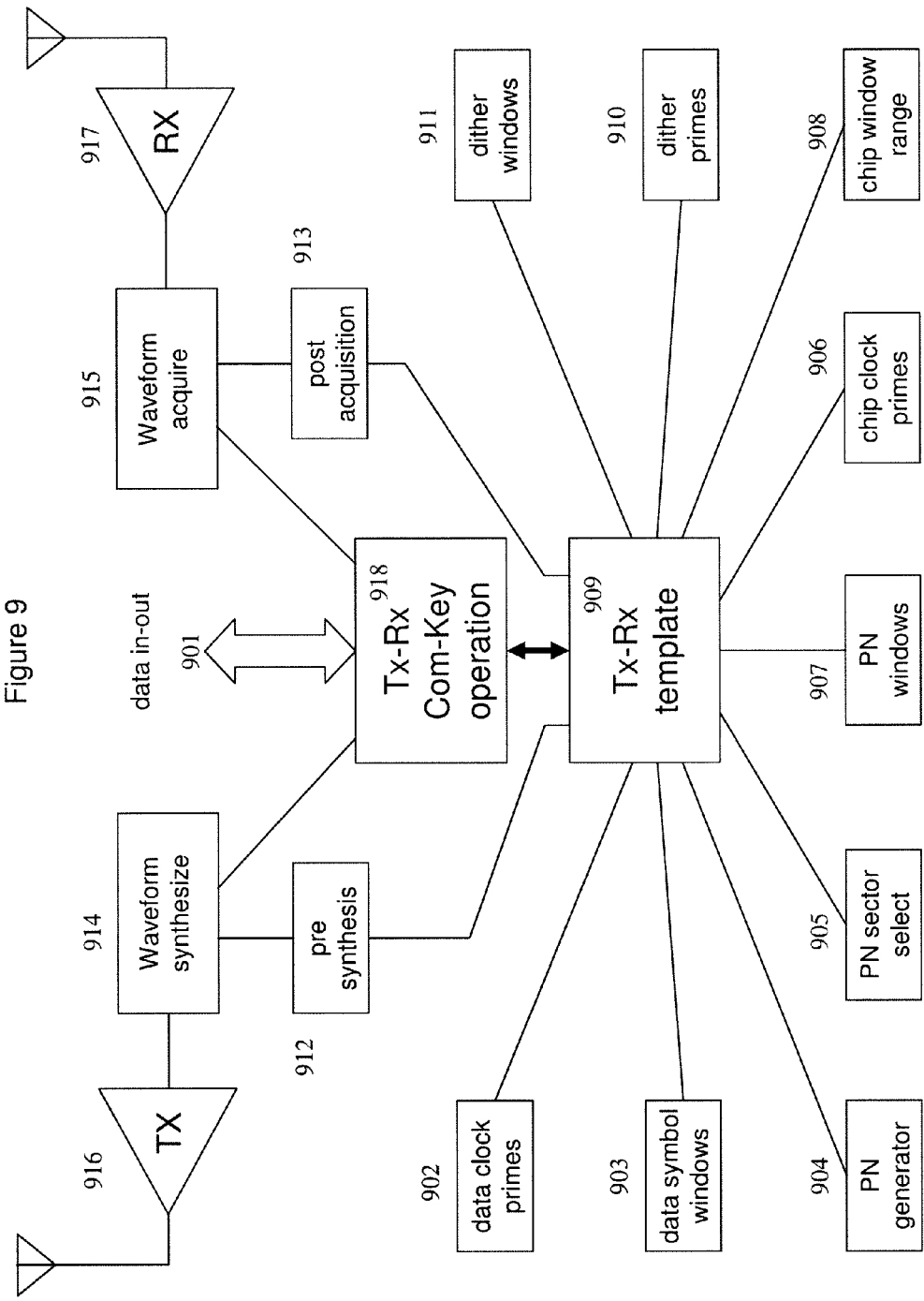
FIG. 9 shows an example of a transmitter-receiver algorithm template.

The coefficients for the secure waveform can be generated using the techniques described in the aforementioned U.S. patent application Ser. No. 11/434,510. It will be readily seen that other types of waveform encryption keys, including, but not limited to conventional keys may also be used with this invention. The Com-Key is a dynamically generated, never-exchanged one-time key which both, or many communicants individually generate and use to both synthesize and acquire and demodulate the secure waveform. In FIG. 9, the transmit-receive Com-Key operation, 918, coordinates and controls the secure waveform synthesis for transmission and the acquisition and demodulation for the receive function. The timing template, 909, is generated by the transmit-receive Com-Key operation, 918, and provides information to the pre-synthesis function, 912, for generation of the signal by the waveform synthesis function, 914. The synthesized waveform is then fed to the transmitter, 916, for frequency conversion, if required, amplification and emission. Conversely, the incoming signal from the receiver, 917, is fed to the waveform acquisition function, 915, which then matches it to the template, via the post acquisition function, 913, under the control of the Tx-Rx Com-Key Operation, 918.

The transmitter system includes one or more memories for storing any information necessary to support signal generation, one or more processors and/or other hardware configured to perform waveform synthesis and pre-synthesis, and any transmitter front-end equipment necessary to generate and supply a suitable transmit signal to an antenna. The receiver system includes receiver equipment necessary to receive a transmitted signal received by an antenna, one or more memories for storing any information necessary to support signal reception, and one or more processors and/or other hardware configured to perform waveform acquisition and post acquisition.

The memories of the transmitter and receiver can be a tangible processor-readable or computer-readable memory that stores or is encoded with instructions that, when executed by the processor, cause the processor to perform the waveform synthesis functions described herein. The processor that executes software stored in the memory can be a fixed data processing element, such as an application specific integrated circuit (ASIC) that is configured, through fixed hardware logic, to perform the waveform synthesis functions. Yet another possible data processing environment is one involving one or more field programmable logic devices (e.g., a field programmable gate array (FPGA)), or a combination of fixed processing elements and programmable logic devices. Software for carrying out waveform synthesis may be embodied in a processor-readable medium that is encoded with instructions for execution by a processor that, when executed by the processor, operate to cause the processor to perform the functions described herein.

FIG. 9 shows the various primes, and associated windows for this example embodiment of the invention. The primes, windows and elements they control produce a template for both waveform generation (transmit) and waveform demodulation (reception). It should be noted that, while a single template for transmit and receive is shown in FIG. 9, two different templates may be generated for simultaneous use by both transmit and receive functions of the same secure waveform enabled communications equipment when separate Com-Keys are used. Two or more Com-Keys may be used to generate multiple templates in a single secure waveform enabled equipment for communication with multiple secure waveform enabled communications equipments or other use for example, but not limited to, multi-channel simultaneous communication. Com-Keys for generation of the template coefficients, hence templates, may be changed at any time during communication.

For the sake of clarity, in this example, a single template is used for both transmit and receive functions. The timing elements, 902 through 911, inclusive, are self evident from the labels on FIG. 9. The timing functions shown in FIG. 8, and the compilation of the waveform can be easily be related to those shown in FIG. 9.

Figure 10:
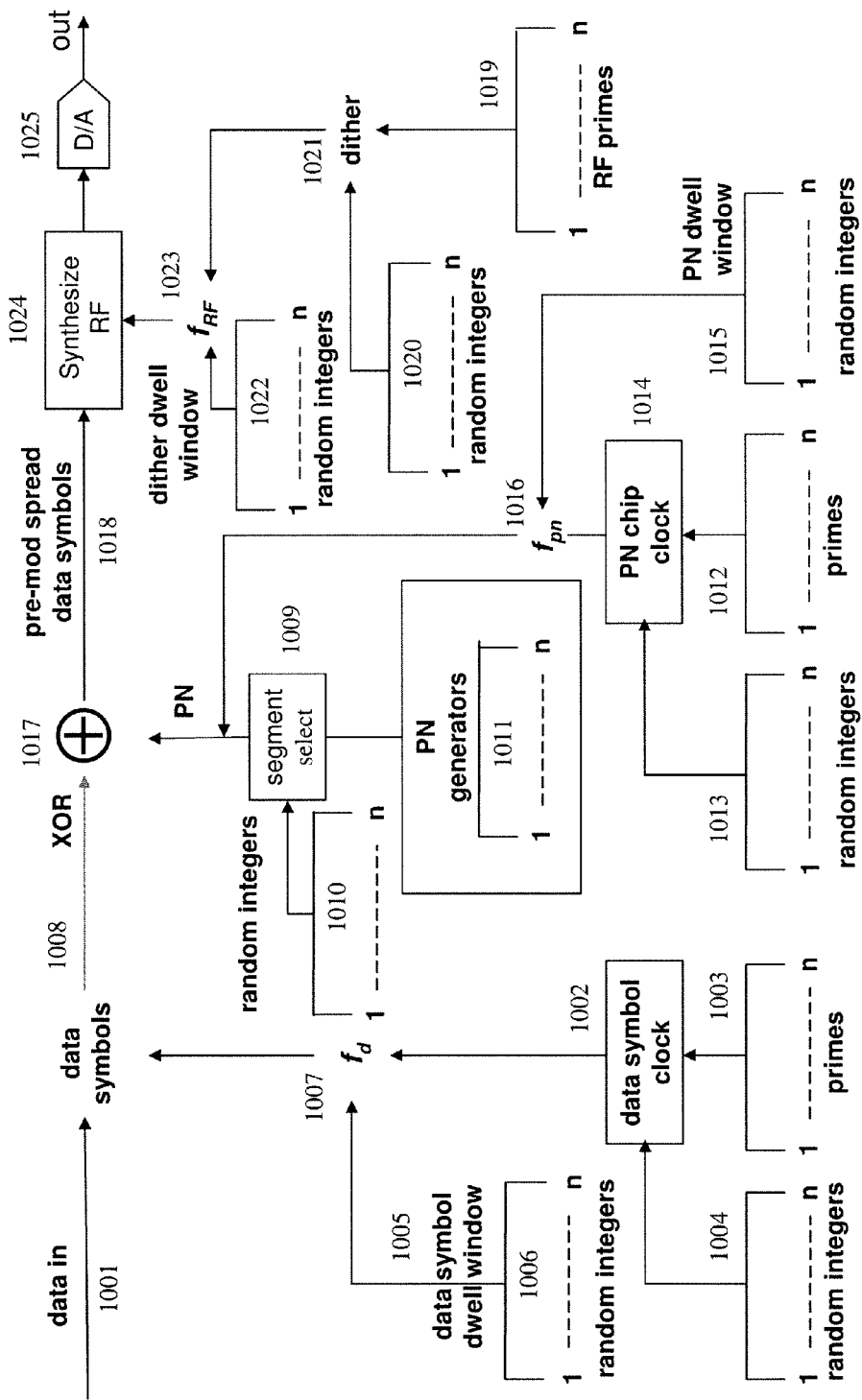
FIG. 10 illustrates an example of baseband virtual element

Those versed in the art will recognize that there are several ways to generate the elements and synthesize the waveform. Mathematically generating the elements and synthesizing the waveform is one of these possibilities. FIG. 10 shows a virtual flow diagram of this possibility for the embodiment of the invention. The input data stream, 1001, is the Bernoulli iid sequence, as described in the foregoing. The data symbol clock, 1002, provides pseudo-randomly varying data symbol timing '$f_d$', 1007, in accordance with the current prime, 1003, randomly selected in accordance with the random integer generator, 1004. The data symbol dwell window, 1005, sized by the random integer generator, 1006, determines how many data symbols are processed at the current timing frequency.

The PN generator, 1011, synthesizes numerous PN sequences, from which segments are randomly selected, 1009, by means of the random integer generator, 1010. The segments are then concatenated in a continuous stream. A prime integer, 1012, randomly selected via the random number generator, 1013, determines the frequency '$f_{pn}$', 1016, of the PN clock, 1014. The PN dwell window is determined by the random integer generator, 1015. The PN is then XORd, 1017, with the randomly varying data stream, 1008, to produce pre-modulation spread data symbols, 1018.

The RF primes, 1019, are continuously randomly selected in accordance with the output of the random integer generator, 1020, determining the basic dither frequencies, 1021. Each frequency is maintained for a period of time, dither dwell window, determined by the random integer generator, 1022. The dithered RF coefficients, '$f_{RF}$', are now modulated, binary phase shift keying (BPSK) in this example, by the synthesize RF function, 1024. The digital coefficients of the carrier are now converted into a physical analog stream by the analog-to-digital converter, 1025. It will be readily seen by those versed in the art, that several types of modulation other than BPSK may be employed, including, but not limited to quadriphase shift keying, (QPSK) and M-ary phase shift keying, (MPSK).

A number of PN codes are generated for and during each communications session. No PN sequence is employed in full. Segments of numerous codes are randomly employed, such that no sequence is ever completed or used again. By this method, even simple maximum length shift register code use becomes exceedingly difficult to identify, and if the first n symbols of the sequence are omitted, where the sequence length is equal to $2^n-1$, this will defy direct identification of the source of the PN sequence. Similarly, the use of symbol groups and/or combination by which other PN codes may be identified are avoided.

There are numerous ways of randomly generating three or more independent prime-based timing elements, including, but not limited, to virtual mathematical synthesization and switched arrays of multiple independent digitally controlled oscillators (DCO).

Due to the use of primes as timing elements, it is not practical to physically derive a continuously varying combination of these from a single master timing circuit. To achieve this, it would require the master timing element to be capable of generating a frequency equal to the product of the product of the highest prime based frequencies, and to instantaneously rapidly switch to other prime product frequencies as primes were randomly changed and instantly derive the individual frequencies required.

This example embodiment of the invention formulates the waveform mathematically, so that FIG. 10 shows a virtual signal flow, purely for ease of explanation. The signal flow arrangement shows the generation of the transmit waveform template elements and their interaction. Thus, for those skilled in the art, it is not necessary to depict the reverse process employed by the receiver.

The ranges of all primes used for virtual timing are first divided into sub-ranges by random selection of primes throughout the initial range that are separated by no less than and no greater than certain sequence numbers such that the primes selected are well separated and they may not be seen as numbers of similar magnitude, producing frequencies that could be misidentified as like frequencies. This will then produce several sub-ranges of each initial range. The order of the primes in each sub-range is then randomized so that they can be used in the resulting order. Dwell windows for the duration of each prime are generated by random permutation of number series' containing all numbers from the minimum to the maximum to be employed. It will be seen that virtual data symbol rates, windowed for random durations, and virtual PN chip rates using randomly selected PN segments are also windowed for random durations, all independently of each other and XOR'd to form the random pre-RF-synthesis sequence.

Both the transmit and receive D/A and A/D electronics are operated at a constant clock rate, so that a change of RF sampling rate will provide the necessary output frequency or convert the received frequency. This method, coupled with the mathematical virtual signal methodology, enables the FPGA, chip or other device to also use constant timing. This alleviates many of the timing problems encountered when placing complex circuits on a chip of any type.

The RF carrier is dithered (shifted) randomly to more evenly spread the peaks of a discrete Fourier transform, (DFT), and even the amplitude of those peaks to make the waveform less recognizable as a signal, but rather as a series of nondescript AWGN perturbations. The mechanism for this can be seen in FIG. 7. Random primes are used to provide the RF carrier, selected via random number application. The frequencies are then used in random order for independently random durations via the windows shown in FIGS. 9 and 10.

Data Symbols and Chips

FIG. 11 is a self explanatory example of a flow chart for this embodiment, describing the combination of chips and data symbols, both of random magnitude, using prime numbers and random windows. Furthermore the number of chips-per-symbol varies independently of the either the size of the data symbol or the magnitude of the chips.

In the following example in Table-1, input data symbols are grouped into windows: 10, 4 9, 6, 5, 8, 7 and 3 along with corresponding data clock primes: 977, 1,031, 907, 991, 798, 1,123, 769 and 1,229. Similarly, PN chip windows: 224, 412, 472, 268 and 520 are associated with chip clock primes: 15,671, 32,933, 49,697, 41,381 and 17,419. It will be seen that the PN prime divided by the data symbol prime will give the chip rate per data symbol. The PN window has a certain number of chips at this rate so they are compared to the data symbol window. If there are more chips than data symbols, then the remaining chips are used on the next data window (of different symbol size). Conversely, if the data symbol exceeds the PN chip window, the current chips are applied until expended and a new chip window is applied at a different rate, as determined by the chip clock prime. It will be seen that chip rates will commonly change during a data symbol. The number of chips applied to a data symbol will seldom fit exactly and a very short chip would cause an undesirable impulse response in the output waveform; therefore, either the chip may be lengthened or the data symbol either lengthened or shortened to accommodate it, so that the transitions, or lack of as a result of XOR would occur simultaneously without creating undesirable spectral artifacts. It will be seen that any difference in primes or windows of either the data symbols or the PN chips will greatly affect the spreading, completely changing the signal encryption and signature.

TABLE 1

Data Symbol Timing Algorithm Example

| Data Symbols Initial Window | Data Symbols Window Remaining | Data Clock Data Prime | PN Clock PN Prime | PN Symbols PN Window | PN Symbols Window Remaining | Data Symbols Spread | Rate Chips/ symbol |
|---|---|---|---|---|---|---|---|
| 10 | 10 | 977 | 15,671 | 224 | 224 | 10 | 16.04 |
| 4 | 4 | 1,031 | 15,671 | 224 | 64 | 4 | 15.2 |
| 9 | 9 | 907 | 15,671 | 224 | 3 | 0.17 | 17.28 |
| 9 | 8.83 | 907 | 32,933 | 412 | 412 | 8.83 | 36.31 |
| 6 | 6 | 991 | 32,933 | 412 | 85 | 2.56 | 33.23 |
| 6 | 3.44 | 991 | 49,697 | 472 | 472 | 3.44 | 50.15 |
| 5 | 5 | 798 | 49,697 | 472 | 171 | 2.75 | 62.28 |
| 5 | 2.25 | 798 | 41,381 | 268 | 268 | 2.25 | 51.86 |
| 8 | 8 | 1,123 | 41,381 | 268 | 151 | 4.1 | 36.85 |
| 8 | 3.9 | 1,123 | 17,419 | 520 | 520 | 3.9 | 15.51 |
| 7 | 7 | 769 | 17,419 | 520 | 450 | 7 | 22.65 |
| 3 | 3 | 1,229 | 17,419 | 520 | 300 | 3 | 14.17 |

It will be also seen that in the absence of any prime or window information, the data template is virtually impossible to reconstruct. Furthermore, when data traffic is passed, random PN segments are used with random insertion and dwell times. Signal modulation phase changes will also be virtually impossible to detect in the absence of all other information.

Having described preferred embodiments of new and improved technique for secure communication using a non-differentiable waveform, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A transmitter system for generating a non-differentiable transmit signal, comprising:
a processor configured to:
receive an input data stream represented by a signal waveform, the signal waveform comprising a plurality of waveform elements, wherein one of the waveform elements is a carrier frequency of the signal waveform;
compute, for each waveform element, a sequence of frequency values, wherein each frequency value is computed based on a randomly selected prime number and the frequency values for each waveform element are independent of the frequency values for every other waveform element;
compute, for each waveform element, a sequence of timing windows whose durations are randomly selected and respectively specify periods over which the frequency values are applied to the waveform element, wherein the timing windows for each waveform element are independent of the timing windows for every other waveform element; and
modify the signal waveform in accordance with the sequence of frequency values and timing windows for each waveform element to produce the non-differentiable transmit signal so that no continuous or relative timing of the waveform elements is present in the resulting waveform; and
a transmitter configured to transmit the non-differentiable transmit signal.

2. The transmitter system of claim 1, wherein one of the waveform elements is a data symbol rate of the signal waveform and the processor is configured to modify the signal waveform to reflect the data symbol rate varying over time in accordance with a respective sequence of frequency values and a respective sequence of timing windows.

3. The transmitter system of claim 1, wherein one of the waveform elements is a pseudo-noise (PN) chip rate of the signal waveform and the processor is configured to modify the signal waveform to reflect the PN chip rate varying over time in accordance with a respective sequence of frequency values and a respective sequence of timing windows.

4. The transmitter system of claim 3, wherein the processor is configured to spread the signal waveform by a PN spreading sequence comprising a plurality of concatenated PN segments, the PN segments being randomly selected portions of a plurality of PN sequences.

5. The transmitter system of claim 1, wherein the processor is configured to modify a value of the carrier frequency based on randomly selected prime numbers at random time intervals such that the signal waveform comprises a random continuous concatenated sequence of unrelated, primitive-based frequency values.

6. The transmitter system of claim 1, wherein the processor comprises a digital-to-analog converter configured to be operated at a constant clock rate, wherein the signal waveform is modified by changing a sampling rate of the digital-to-analog converter.

7. The transmitter system of claim 1, wherein the processor is configured to compute the sequence of frequency values using prime numbers on a one-time basis.

8. The transmitter system of claim 1, wherein the processor is configured to compute the sequence of frequency values and timing windows for each waveform element of the signal waveform using virtual mathematical timing.

9. The transmitter system of claim 1, wherein the processor is configured to use constant timing.

10. A method of generating a non-differentiable transmit signal, the method comprising:
generating in a transmitter system an input data stream represented by a signal waveform, the signal waveform comprising a plurality of waveform elements, wherein one of the waveform elements is a carrier frequency of the signal waveform;
for each waveform element, computing in the transmitter system a sequence of frequency values, wherein each frequency value is computed based on a randomly selected prime number and the frequency values for each waveform element are independent of the frequency values for every other waveform element;

for each waveform element, computing in the transmitter system a sequence of timing windows whose durations are randomly selected and respectively specify periods over which the frequency values are applied to the waveform element, wherein the timing windows for each waveform element are independent of the timing windows for every other waveform element;

modifying the signal waveform in the transmitter system in accordance with the sequence of frequency values and timing windows for each waveform element to produce the non-differentiable transmit signal so that no continuous or relative timing of the waveform elements is present in the resulting waveform; and transmitting the non-differentiable transmit signal.

11. The method of claim 10, wherein one of the waveform elements is a data symbol rate of the signal waveform and the signal waveform is modified to reflect the data symbol rate varying over time in accordance with a respective sequence of frequency values and a respective sequence of timing windows.

12. The method of claim 10, wherein one of the waveform elements is a pseudo-noise (PN) chip rate of the signal waveform and the signal waveform is modified to reflect the PN chip rate varying over time in accordance with a respective sequence of frequency values and a respective sequence of timing windows.

13. The method of claim 12, wherein the signal waveform is spread by a PN spreading sequence comprising a plurality of concatenated PN segments, the PN segments being randomly selected portions of a plurality of PN sequences.

14. The method of claim 10, wherein a value of the carrier frequency is modified based on randomly selected prime numbers at random time intervals such that the signal waveform comprises a random continuous concatenated sequence of unrelated, primitive-based frequency values.

15. The method of claim 10, wherein the signal waveform is modified by changing a sampling rate of a digital-to-analog converter operated at a constant clock rate.

16. The method of claim 10, wherein computing the sequence of frequency values further comprising using prime numbers on a one-time basis.

17. The method of claim 10, wherein computing the sequence of frequency values and timing windows for each waveform element of the signal waveform are performed using virtual mathematical timing.

18. The method of claim 10, wherein the method is implemented on a device that uses constant timing.

19. A non-transitory controller-readable medium encoded with instructions that, when executed by a processor, cause the processor to:

receive an input data stream represented by a signal waveform, the signal waveform comprising a plurality of waveform elements, wherein one of the waveform elements is a carrier frequency of the signal waveform;

compute, for each waveform element, a sequence of frequency values, wherein each frequency value is computed based on a randomly selected prime number and the frequency values for each waveform element are independent of the frequency values for every other waveform element;

compute, for each waveform element, a sequence of timing windows whose durations are randomly selected and respectively specify periods over which the frequency values are applied to the waveform element, wherein the timing windows for each waveform element are independent of the timing windows for every other waveform element; and modify the signal waveform in accordance with the sequence of frequency values and timing windows for each waveform element to produce the non-differentiable transmit signal so that no continuous or relative timing of the waveform elements is present in the resulting waveform.

20. A method of receiving a non-differentiable signal, the method comprising:

receiving in a receiver system a non-differentiable signal comprising represented by a signal waveform, the signal waveform comprising a plurality of waveform elements, wherein one of the waveform elements is a carrier frequency of the signal waveform;

for each waveform element, computing in the receiver system a sequence of frequency values, wherein each frequency value is computed based on a randomly selected prime number and the frequency values for each waveform element are independent of the frequency values for every other waveform element;

for each waveform element, computing in the receiver system a sequence of timing windows whose durations are randomly selected and respectively specify periods over which the frequency values are applied to the waveform element, wherein the timing windows for each waveform element are independent of the timing windows for every other waveform element and no continuous or relative timing of the waveform elements is present in the signal waveform;

processing the signal waveform in the receiver system in accordance with the sequence of frequency values and timing windows for each waveform element to recover the from the non-differentiable signal.

21. The method of claim 20, wherein one of the waveform elements is a data symbol rate of the signal waveform and the signal waveform is modified to reflect the data symbol rate varying over time in accordance with a respective sequence of frequency values and a respective sequence of timing windows.

22. The method of claim 20, wherein one of the waveform elements is a pseudo-noise (PN) chip rate of the signal waveform and the signal waveform is modified to reflect the PN chip rate varying over time in accordance with a respective sequence of frequency values and a respective sequence of timing windows.

23. The method of claim 20, wherein a value of the carrier frequency is modified based on randomly selected prime numbers at random time intervals such that the signal waveform comprises a random continuous concatenated sequence of unrelated, primitive-based frequency values.

24. The method of claim 20, wherein the signal waveform is modified by changing a sampling rate of an analog-to-digital converter operated at a constant clock rate.

* * * * *